United States Patent
Ohara et al.

(10) Patent No.: US 6,819,860 B2
(45) Date of Patent: Nov. 16, 2004

(54) OPTICAL AMPLIFYING GLASS AND OPTICAL WAVEGUIDE

(75) Inventors: Seiki Ohara, Yokohama (JP); Hideaki Hayashi, Yokohama (JP); Naoki Sugimoto, Yokohama (JP); Katsuhiro Ochiai, Yokohama (JP); Yasuji Fukasawa, Yokohama (JP); Takeshi Hirose, Yokohama (JP); Manuel Reyes, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 152 days.

(21) Appl. No.: 10/265,248

(22) Filed: Oct. 7, 2002

(65) Prior Publication Data

US 2003/0118316 A1 Jun. 26, 2003

(30) Foreign Application Priority Data

Oct. 10, 2001 (JP) .................................. 2001-313157

(51) Int. Cl.$^7$ ................................................. G02B 6/02
(52) U.S. Cl. ........................... 385/142; 501/37; 501/53; 501/900
(58) Field of Search ................................ 385/141–145; 501/35–78, 900

(56) References Cited

U.S. PATENT DOCUMENTS

| | | | | |
|---|---|---|---|---|
| 5,796,903 A | * | 8/1998 | Tran ............................ | 385/123 |
| 6,128,430 A | * | 10/2000 | Chu et al. .................... | 385/142 |
| 6,268,303 B1 | * | 7/2001 | Aitken et al. ................. | 501/63 |
| 6,385,384 B1 | * | 5/2002 | Wei ............................. | 385/141 |
| 6,413,891 B1 | * | 7/2002 | Cho et al. ..................... | 501/41 |
| 6,417,963 B1 | * | 7/2002 | Ohishi et al. ............. | 359/341.1 |
| 6,495,481 B1 | * | 12/2002 | Margaryan ................... | 501/44 |
| 6,501,596 B1 | * | 12/2002 | Inoue et al. .............. | 359/341.5 |
| 6,515,795 B1 | * | 2/2003 | Dejneka et al. .......... | 359/341.5 |
| 6,599,852 B2 | * | 7/2003 | Kondo et al. ................. | 501/42 |
| 6,599,853 B2 | * | 7/2003 | Sugimoto et al. ............. | 501/50 |
| 6,620,748 B1 | * | 9/2003 | Sugimoto et al. ............. | 501/64 |
| 6,630,420 B1 | * | 10/2003 | Naumann et al. ............. | 501/70 |

| | | | |
|---|---|---|---|
| 2001/0044369 A1 | | 11/2001 | Sugimoto et al. |

FOREIGN PATENT DOCUMENTS

| | | |
|---|---|---|
| EP | 1 254 869 | 11/2002 |
| JP | 2001-213635 | 8/2001 |
| WO | WO 01/55041 | 8/2001 |
| WO | WO 02/10080 | 2/2002 |

OTHER PUBLICATIONS

Keiichi Aiso, et al., "Erbium Lanthanum co–doped fiber for L–band amplifier with high efficiency, low non–linearity and low NF", TuA6–1, 2001.
U.S. patent application Ser. No. 09/923,348, filed Aug. 8, 2001, pending.
U.S. patent application Ser. No. 09/861,716, filed May 22, 2001, pending.
U.S. patent application Ser. No. 09/840,136, filed Apr. 24, 2001, pending.
U.S. patent application Ser. No. 10/197,579, filed Jul. 18, 2002, pending.
U.S. patent application Ser. No. 09/766,982, filed Jan. 23, 2001, pending.
U.S. patent application Ser. No. 09/718,395, filed Nov. 24, 2000, pending.
U.S. patent application Ser. No. 09/807,426, filed Apr. 20, 2001, pending.
U.S. patent application Ser. No. 10/265,248, Ohara, et al., filed Oct. 7, 2002.
U.S. patent application Ser. No. 10/197,579, Sugimoto, et al., filed Jul. 18, 2002.

* cited by examiner

*Primary Examiner*—Ellen E. Kim
(74) *Attorney, Agent, or Firm*—Oblon, Spivak, McClelland, Maier & Neustadt, P.C.

(57) ABSTRACT

An optical amplifying glass comprising 100 parts by mass of a matrix glass and from 0.1 to 10 parts by mass of Er doped to the matrix glass, wherein the matrix glass comprises $Bi_2O_3$, at least one of $B_2O_3$ and $SiO_2$, at least one member selected from the group consisting of $Ga_2O_3$, $WO_3$ and $TeO_2$, and $La_2O_3$ in such a ratio that $Bi_2O_3$ is from 20 to 80 mol %, $B_2O_3+SiO_2$ is from 5 to 75 mol %, $Ga_2O_3+WO_3+TeO_2$ is from 0.1 to 35 mol %, and $La_2O_3$ is from 0.01 to 15 mol %.

9 Claims, No Drawings

OPTICAL AMPLIFYING GLASS AND OPTICAL WAVEGUIDE

The present invention relates to an optical amplifying glass which is suitable for amplification of a light with a wavelength of from 1,530 to 1,630 nm.

As an optical communication system capable of coping with diversification of communication services, a wavelength division multiplexing communication system (WDM) has, for example, been proposed to increase the transmission capacity by increasing the number of wavelength division multiplexing channels.

In e.g. WDM using a light in C band (wavelength: 1,530 to 1,560 nm) or L band (wavelength: 1,570 to 1,620 nm) as a signal light, an optical fiber amplifier is essential which amplifies such a signal light. As such an amplifier, EDFA is being developed.

EDFA is an optical fiber amplifier wherein the core of the optical fiber is an Er-doped glass. As such an optical fiber, an Er-doped $SiO_2$ fiber wherein the core is $SiO_2$ glass, or an Er-doped fluoride glass fiber wherein the core is fluoride glass, may, for example, be mentioned.

However, EDFA employing the Er-doped $SiO_2$ fiber has had a problem that the length of the optical fiber is typically at least 20 m, and it has to be wound into a bobbin in order to accommodate it in an EDFA container having a size of about 30 cm.

Whereas, EDFA using an Er-doped fluoride glass fiber, has had a drawback that its glass transition point is typically at most 320° C., whereby a thermal damage is likely to result if the intensity of excitation light for optical amplification increases.

In order to solve these problems, JP-A-2001-102661 discloses a resin-coated glass fiber having a length of 6 cm, whereby a gain of at least 9 dB can be obtained with respect to a signal light having a wavelength of from 1.50 μm to 1.59 μm and an intensity of 0.001 mW. Here, the length is 6 cm, whereby it is unnecessary to wind it into a bobbin. Further, the core of the above resin-coated glass fiber, is an Er-doped bismuth oxide type glass (hereinafter referred to as the conventional glass) having Er doped in a proportion of 0.6 part by mass per 100 parts by mass of a bismuth oxide type matrix glass (as represented by mol %, $Bi_2O_3$: 42.8%, $B_2O_3$: 28.5%, $SiO_2$: 14.3%, $Ga_2O_3$: 7.1%, $Al_2O_3$: 7.1%, and $CeO_2$: 0.2%).

The above-mentioned gain of the conventional glass is one with respect to a case where the fiber length is 6 cm, and the intensity of the signal light is 0.001 mW. It is commonly known that the gain decreases as the intensity of the signal light increases, and a gain of a desired level may not be obtained by the conventional glass with respect to a signal light having an intensity of about 0.1 mW, which is commonly used for e.g. WDM.

Further, if the conventional glass is used for amplification of a light within a wavelength region including L band, a conversion efficiency of a desired level, may not be obtained.

It is an object of the present invention to provide an optical amplifying glass and an optical waveguide, which are capable of solving the above-mentioned problems.

The present invention provides an optical amplifying glass comprising 100 parts by mass of a matrix glass and from 0.1 to 10 parts by mass of Er doped to the matrix glass, wherein the matrix glass comprises $Bi_2O_3$, at least one of $B_2O_3$ and $SiO_2$, at least one member selected from the group consisting of $Ga_2O_3$, $WO_3$ and $TeO_2$, and $La_2O_3$ in such a ratio that $Bi_2O_3$ is from 20 to 80 mol %, $B_2O_3+SiO_2$ is from 5 to 75 mol %, $Ga_2O_3+WO_3+TeO_2$ is from 0.1 to 35 mol %, and $La_2O_3$ is from 0.01 to 15 mol %.

Further, the present invention provides an optical waveguide comprising the above optical amplifying glass as the core.

Now, the present invention will be described in detail with reference to the preferred embodiments.

The optical amplifying glass of the present invention (hereinafter referred to as the glass of the present invention) is used usually as a core of an optical waveguide having a core/cladding structure, such as a glass fiber having the same structure or a plane waveguide having the same structure. Such an optical waveguide is the waveguide of the present invention.

The optical waveguide of the present invention is suitable for amplifying a light with a wavelength of from 1,530 to 1,630 nm, particularly a light in C band in a short length. Further, it is suitable for amplifying a light in L band at a high conversion efficiency.

Such amplification is carried out by introducing an excitation light together with a light to be amplified (i.e. a signal light) into the core. As such an excitation light, a laser beam having a wavelength of from 970 to 990 nm or from 1,470 to 1,490 nm is usually employed. Usually, for amplification of a light in C band, an excitation light having a wavelength of from 970 to 990 nm is used, and for amplification of a light in L band, an excitation light having a wavelength of 1,470 to 1,490 nm is used. However, the excitation light is not limited thereto.

In a case where the optical waveguide of the present invention is used for amplification of a light in C band in a length of 8 cm or less, the gain for a light having a wavelength of from 1,530 nm to 1,560 nm and an intensity of 0.1 mW, is preferably at least 8 dB when the length of the optical waveguide is 5 cm. If the gain when the length is 5 cm, is less than 8 dB, the above problem may not be solved. Namely, when the length is 8 cm or less, no adequate gain may be obtained with respect to a signal light having an intensity of 0.1 mW. The above gain when the length is 5 cm, is more preferably at least 9 dB.

In a case where the optical waveguide of the present invention is used for amplification of a light in the wavelength region including L band, the conversion efficiency η for a light having a wavelength of 1,600 nm, is preferably at least 10%. If it is less than 10%, the desired gain may not be obtained. It is more preferably at least 15%. Here, η is represented by a percentage of the ratio of the signal light output intensity to the excitation light intensity.

It is more preferred that η is at least 10%, and the 3-dB down bandwidth for a light having an intensity of 1 mW within a wavelength region of from 1,530 to 1,620 nm, is at least 55 nm, particularly preferably at least 60 nm.

Further, it is more preferred that η is at least 10%, and the gain for a light having a wavelength of 1,620 nm and an intensity of 1 mW, is at least 10 dB, particularly preferably at least 15 dB.

It is particularly preferred that η is at least 10%, the 3-dB down bandwidth for a light having an intensity of 1 mW within a wavelength region of from 1,530 to 1,620 nm, is at least 55 nm, and the gain for a light having a wavelength of 1,620 nm and an intensity of 1 mW, is at least 10 dB.

In an optical fiber having the glass of the present invention as a core (hereinafter referred to as an optical fiber of the present invention), the core diameter and the cladding diameter are typically from 2 to 10 μm, and from 100 to 200 μm, respectively.

When the optical fiber of the present invention is used for EDFA without being wound into a bobbin, its length is preferably at most 8 cm, more preferably at most 6 cm, particularly preferably at most 5 cm.

It is preferred that the refractive index $n_2$ of the cladding of the optical fiber of the present invention and the refractive index $n_1$ of the core i.e. the glass of the present invention, will satisfy the following formula. Here, $n_1$ is typically from 1.8 to 2.2.

$$0.0005 \leq (n_1-n_2)/n_1 \leq 0.1$$

Further, it is preferred that the above cladding is made of a glass, and it is more preferred that such a glass consists essentially of, as represented by mol %, from 25 to 70% of $Bi_2O_3$, from 5 to 74.89% of $B_2O_3+SiO_2$, from 0.1 to 30% of $Al_2O_3+Ga_2O_3$, and from 0.01 to 10% of $CeO_2$.

The optical fiber of the present invention may be prepared, for example, by preparing a preform having the core glass and the cladding glass combined by a well-known extrusion method, and drawing such a preform.

The glass transition point $T_g$ of the glass of the present invention is preferably at least 360° C. If $T_g$ is lower than 360° C., when a laser beam with a high intensity is used as an excitation light, the temperature of the glass tends to be locally high and thermally damaged, whereby the optical loss may increase, and the optical amplification tends to be inadequate. More preferably, the glass transition point is at least 400° C., particularly preferably at least 420° C.

The glass of the present invention comprises a matrix glass and Er.

If the amount of Er to the matrix glass, is less than 0.1 part by mass per 100 parts by mass of the matrix glass, no adequate gain can be obtained. It is preferably at least 0.2 part by mass. If it exceeds 10 parts by mass, vitrification tends to be difficult, or due to concentration quenching, the gain tends to rather decrease. It is preferably at most 7 parts by mass, more preferably at most 4 parts by mass, particularly preferably at most 3 parts by mass.

In a case where the glass of the present invention is to be used as an optical fiber (the length is typically at most 8 cm) to be used for EDFA without being wound into a bobbin or to be used for a compact plane waveguide (the length is typically at most 8 cm) to be used for EDFA, Er is preferably incorporated in an amount of at least 0.5 part by mass, more preferably at least 0.8 part by mass, particularly preferably at least 1.0 part by mass, per 100 parts by mass of the matrix glass.

The proportion of Er in these cases, is preferably from 1 to 3 parts by mass, more preferably from 1.2 to 3 parts by mass, particularly preferably from 1.5 to 3 parts by mass, per 100 parts by mass of the matrix glass.

In a case where the glass of the present invention is to be used for amplification of a light in a wavelength region including L band, Er is incorporated preferably in an amount of at least 0.1 part by mass and less than 1 part by mass, per 100 parts by mass of the matrix glass. It is more preferably at least 0.2 part by mass, particularly preferably at least 0.3 part by mass, and it is more preferably at most 0.9 part by mass, particularly preferably at most 0.8 part by mass.

Now, the composition of the matrix glass in the glass of the present invention will be described, wherein mol % will be represented simply by %.

$Bi_2O_3$ is an essential component. If its content is less than 20%, the wavelength width $\Delta\lambda$ wherein the gain is obtainable, tends to be small. Its content is preferably at least 30%, more preferably at least 35%, particularly preferably at least 40%. If the content exceeds 80%, vitrification tends to be difficult, devitrification tends to take place during processing into a fiber, or $T_g$ tends to be too low. The content is preferably at most 70%, more preferably at most 60%, particularly preferably at most 50%. Here, devitrification is one where precipitation of crystals is remarkable and one whereby fiber breakage is likely to take place during processing into a fiber, or fiber breakage is likely to take place during the use as an optical fiber.

$B_2O_3$ and $SiO_2$ are network formers, and at least one of them must be contained in order to facilitate formation of glass by suppressing precipitation of crystals during the production of the glass. If their total content $B_2O_3+SiO_2$ is less than 5%, vitrification tends to be difficult, or devitrification takes place during processing into a fiber. The total content is more preferably at least 10%, more preferably at least 15%, particularly preferably at least 19%, most preferably at least 25%. If it exceeds 75%, the gain tends to decrease. It is more preferably at most 60%, still more preferably at most 55%, particularly preferably at most 45%, most preferably at most 40%.

The content of $B_2O_3$ is preferably at most 60%, more preferably at most 45%, particular preferably at most 30%. In a case where it is desired to improve the water resistance or to increase the gain, the content is preferably adjusted to be at most 20%, and more preferably, no $B_2O_3$ is incorporated.

The content of $SiO_2$ is preferably at most 60%, more preferably at most 50%, particularly preferably at most 45%, most preferably at most 40%. When $SiO_2$ is incorporated, its content is preferably at least 1%, more preferably at least 10%, particularly preferably at least 19%, most preferably at least 25%.

$Ga_2O_3$, $WO_3$ and $TeO_2$ are components which increase $\Delta\lambda$. At least one member from these three components must be incorporated. If their total content $Ga_2O_3+WO_3+TeO_2$ is less than 0.1%, $\Delta\lambda$ tends to be small. The total content is preferably at least 3%, more preferably at least 5%, particularly preferably at least 10%, and if it exceeds 35%, the gain tends to be low. It is preferably at most 30%, more preferably at most 25%.

When it is desired to increase $\Delta\lambda$, it is preferred to incorporate $Ga_2O_3$.

The content of $Ga_2O_3$ is preferably at most 30%, more preferably at most 20%. When $Ga_2O_3$ is incorporated, its content is preferably at least 1%, more preferably at least 5%, particularly preferably at least 10%.

The content of $WO_3$ is preferably at most 30%, more preferably at most 20%, particularly preferably at most 10%. When $WO_3$ is incorporated, its content is preferably at least 1%, more preferably at least 3%.

The content of $TeO_2$ is preferably at most 30%, more preferably at most 20%. When $TeO_2$ is incorporated, its content is preferably at least 1%, more preferably at least 3%.

$La_2O_3$ is essential and has an effect to make concentration quenching less likely to take place or an effect to increase the gain. If it is less than 0.01%, such effects tend to be small. It is preferably at least 0.1%. If it exceeds 15%, vitrification tends to be difficult, or the optical loss tends to increase. It is preferably at most 12%, more preferably at most 10%.

In a case where the glass of the present invention is to be used for an optical fiber to be used for EDFA without being wound into a bobbin, or to be used for a compact plane waveguide to be used for EDFA, the amount of Er incorporated to the matrix glass tends to be typically high at a level of at least 1 part by mass, and in order to suppress concentration quenching due to Er, $La_2O_3$ is preferably at least 1%, more preferably at least 2%.

In a case where the glass of the present invention is to be used for amplification of a light in a wavelength region including L band, $La_2O_3$ is preferably from 0.5 to 4%. In such a case, the length of the optical fiber or the plane waveguide is long (typically at least 80 cm), and if it exceeds 4%, the desired optical amplification tends to be hardly obtainable due to an optical loss. It is more preferably at most 3%, particularly preferably at most 2.5%.

In the present invention, the matrix glass preferably consists essentially of, based on the following oxides:

| | |
|---|---|
| $Bi_2O_3$ | 20 to 80%, |
| $B_2O_3$ | 0 to 60%, |
| $SiO_2$ | 0 to 60%, |
| $Ga_2O_3$ | 0 to 30%, |
| $WO_3$ | 0 to 30%, |
| $TeO_2$ | 0 to 30%, |
| $La_2O_3$ | 0.01 to 15%, |
| $Al_2O_3$ | 0 to 10%, |
| $GeO_2$ | 0 to 30%, |
| $TiO_2$ | 0 to 30%, |
| $SnO_2$ | 0 to 30%, and |
| $CeO_2$ | 0 to 2%. |

Of the above preferred matrix glass, components other than $Bi_2O_3$, $B_2O_3$, $SiO_2$, $Ga_2O_3$, $WO_3$, $TeO_2$ and $La_2O_3$ as described in the foregoing, will be described.

$Al_2O_3$ is not essential, but may be incorporated up to 10%, to facilitate formation of the glass by suppressing precipitation of crystals during the preparation of the glass. If it exceeds 10%, the optical amplification factor may decrease. It is more preferably at most 9%, still more preferably at most 8%, particularly preferably at most 7%, most preferably at most 5%. When $Al_2O_3$ is incorporated, its content is preferably at least 0.1%, more preferably at least 1%, particularly preferably at least 2%.

In order to facilitate formation of the glass by suppressing precipitation of crystals during the preparation of the glass, it is preferred to incorporate at least one of $Al_2O_3$ and $Ga_2O_3$, and their total content $Al_2O_3+Ga_2O_3$ is preferably at most 30%. If the total content exceeds 30%, vitrification tends to be difficult, or $T_g$ tends to be low. More preferably, it is at most 25%. Further, $Al_2O_3+Ga_2O_3$ is preferably at least 3%, more preferably at least 8%, particularly preferably at least 12%.

$GeO_2$ is not essential, but may be incorporated up to 30%, as it has an effect to facilitate formation of the glass or an effect to increase the refractive index. If it exceeds 30%, the glass tends to crystallize. It is preferably at most 10%, more preferably at most 5%. When $GeO_2$ is incorporated, its content is preferably at least 0.1%, more preferably at least 1%.

$CeO_2$ is not essential, but may be incorporated up to 2% to prevent $Bi_2O_3$ from precipitating in the form of metal bismuth in the molten glass and thereby lowering the transparency of the glass. If it exceeds 2%, coloration of the glass with a yellow color or an orange color tends to be substantial, whereby the transmittance tends to decrease. It is preferably at most 1%, more preferably at most 0.5%. When $CeO_2$ is incorporated, its content is preferably at least 0.1%. When it is desired to increase the transparency, it is preferred that no $CeO_2$ is incorporated.

Each of $TiO_2$ and $SnO_2$ is not essential, but each may be incorporated within a range of up to 30%, in order to suppress devitrification during the processing into a fiber. Each content is more preferably at most 10%.

A preferred matrix glass in the present invention consists essentially of the above-described components, but other components may be incorporated within a range not to impair the purpose of the present invention. The total content of such "other components" is preferably at most 10%. For example, MgO, CaO, SrO, BaO, $Na_2O$, $K_2O$, $ZrO_2$, ZnO, CdO, $In_2O_3$, PbO, etc., may be incorporated to suppress devitrification during the processing into a fiber or to facilitate vitrification, and $Yb_2O_3$ may be incorporated to suppress devitrification or concentration quenching. Further, when $Yb_2O_3$ is incorporated, its content is preferably at most 5%.

With respect to the method for producing the glass of the present invention, there is no particular restriction. For example, it may be produced by a melting method wherein the starting materials are prepared and mixed, put into a gold crucible, an alumina crucible, a $SiO_2$ crucible or an iridium crucible and melted at a temperature of from 800 to 1,300° C. in air, and the obtained melt is cast into a prescribed mold. Otherwise, it may be produced by a method other than the melting method, such as a sol-gel method or a gas phase vapor deposition method.

EXAMPLES

To a matrix glass having a composition as shown by mol % in the lines for from $Bi_2O_3$ to $CeO_2$ in Tables 1 to 3, Er was added in a proportion as shown by parts by mass in the Tables per 100 parts by mass of the matrix glass, and the glass thus obtained was melted at 1,200° C. by a melting method. In Example 1 (cladding), Example 2 (cladding), Example 3 (cladding), Example 4 (cladding), Example 5 (cladding) and Example 6 (cladding), no Er was incorporated. Example 1 (core), Example 3 (core), Example 4 (core) and Example 5 (core) are Examples of the glass of the present invention. Other glasses are Comparative Examples.

With respect to these glasses, the refractive index n at a wavelength of 1.55 μm was measured by an ellipsometer, and the glass transition point $T_g$ (unit: ° C.) was measured by a differential thermal analysis (DTA). The results are shown in the Tables.

An optical fiber 1 having a core diameter of 4 μm, a cladding diameter of 124 μm and a length of 5 cm was prepared from Example 1 (core) and Example 1 (cladding) by drawing a preform which was prepared by a well-known extrusion method. Likewise, an optical fiber 2 having a core diameter of 4 μm, a cladding diameter of 124 μm and a length of 5 cm, was prepared from Example 2 (core) and Example 2 (cladding); an optical fiber 3 having a core diameter of 4.5 μm, a cladding diameter of 125 μm and a length of 98 cm, was prepared from Example 3 (core) and Example 3 (cladding); an optical fiber 4 having a core diameter of 4.9 μm, a cladding diameter of 125 μm and a length of 254 cm, was prepared from Example 4 (core) and Example 4 (cladding); an optical fiber 5 having a core diameter of 4.7 μm, a cladding diameter of 125 μm and a length of 253 cm, was prepared from Example 5 (core) and Example 5 (cladding); and an optical fiber 6 having a core diameter of 4.0 μm, a cladding diameter of 125 μm and length of 118 cm, was prepared from Example 6 (core) and Example 6 (cladding). The optical fibers 1, 3, 4 and 5 are Examples of the optical waveguide of the present invention, and the optical fibers 2 and 6 are Comparative Examples.

To the optical fibers 1 and 2, a laser beam (an excitation light) having a wavelength of 980 nm and an intensity of 230 mW and a signal light (intensity=0.1 mW) having a wavelength (unit: nm) as identified in Tables 4 and 5, were introduced, and to the optical fibers 3 to 6, a laser beam (an excitation light) having a wavelength of 1,480 nm and intensity of 280 mW and a signal light (intensity=1 mW) having a wavelength as identified in Tables 4 and 5, were introduced, whereupon the gain G (unit: dB) was measured. The results of the measurement of G are shown in Tables 4 and 5.

G is calculated by the following formula from the incident strength $I_{in}$ of the signal light into the optical fiber and the output intensity $I_{out}$ from the optical fiber, and the measurement error is within ±0.5 dB.

$$G = 10 \times \log(I_{out} - I_{in}/I_{in})$$

From Tables 4 and 5, it is evident that the 3-dB down bandwidth for a light having an intensity of 1 mW is 75 nm, 75 nm or more, 70 nm or more, and 70 nm or more with the optical fibers 3, 4, 5 and 6, respectively.

Further, G (unit: dB) was measured by introducing a laser beam (an excitation light) having a wavelength of 980 nm and an intensity (unit: mW) as identified in Table 6 and a signal light (intensity=1 mW) having a wavelength of 1,560 nm, to the optical fibers 1 and 2. From the results of the measurements shown in Table 6, it is evident that with the optical fiber 1 having a length of 5 cm, G of at least 8 dB can be obtained when the excitation light intensity is at least 120 mW.

Further, G (unit: dB) and $I_{out}$ (unit: mW) were measured by introducing a laser beam (an excitation light) having a wavelength of 1,480 nm and an intensity (unit: mW) as identified in Table 7 or 8 and a signal light (intensity=1 mW) having a wavelength of 1,600 nm, to the optical fibers 3 to 6. The results of the measurement of G is shown in Table 7, and the results of the measurement of $I_{out}$ are shown in Table 8.

From Table 8, it is evident that the above-mentioned η becomes at least 10%, with the optical fiber 3 when the excitation light intensity is at least 186 mW, with the optical fiber 4 when the excitation light intensity is at least 100 mW, and with the optical fiber 5, when the excitation light intensity is at least 79 mW. On the other hand, with the optical fiber 6 as a Comparative Example, even if the excitation light intensity is 400 mW, η is 8.2%, i.e. less than 10%.

Further, in Tables 6, 7 and 8, the case where the intensity is 0 mW, represents a case where only the signal light was introduced without introducing the laser beam.

The optical fiber 1 is suitable for the above-mentioned case wherein it is used for an optical fiber to be used for EDFA without being wound into a bobbin or in the above-mentioned case where it is used for a compact plane waveguide to be used for EDFA.

The optical fibers 3, 4 and 5 are suitable for a case where they are used for amplification of a light in a wavelength region including L band.

Further, the relation between the content of $La_2O_3$ and the optical loss, was examined as follows. Namely, in the same manner as described above, glasses were prepared in which the $La_2O_3$ content of 4.3 mol % in Example 3 (core) and Example 3 (cladding) was reduced to 2.8 mol % as in Example 7 (core) and Example 7 (cladding), to 1.4 mol % as in Example 8 (core) or Example 8 (cladding) or to 0 mol % as in Example 9 (core) and Example 9 (cladding). The content of $SiO_2$ was increased to set off the reduction of the $La_2O_3$ content. In Table 9, the glass compositions of Example 7 (core) to Example 9 (cladding) are shown in the same manner as in Tables 1 to 3.

In the same manner as the optical fiber 3, an optical fiber 7 was prepared from Example 7 (core) and Example 7 (cladding), an optical fiber 8 was prepared from Example 8 (core) and Example 8 (cladding), and an optical fiber 9 was prepared from Example 9 (core) and Example 9 (cladding).

The optical losses of the optical fibers 3, 7, 8 and 9 with respect to a light having a wavelength of 1,310 nm, were measured by a cut back method and were found to be 2.1 dB/m, 1.4 dB/m, 0.7 dB/m and 0.7 dB/m, respectively. Namely, if the $La_2O_3$ content exceeds 4 mol %, the optical loss is at least 2 dB/m, and the optical loss may not be negligible with a long optical fiber. Here, in order to avoid absorption by Er, the light having the above-mentioned wavelength was used for the measurement of the optical loss.

TABLE 1

|  | Example 1 (core) | Example 1 (cladding) | Example 2 (core) | Example 2 (cladding) |
|---|---|---|---|---|
| $Bi_2O_3$ | 42.7 | 42.8 | 42.8 | 42.8 |
| $SiO_2$ | 31.4 | 35.6 | 35.6 | 35.6 |
| $Ga_2O_3$ | 17.8 | 14.3 | 17.8 | 14.3 |
| $La_2O_3$ | 4.3 | 0 | 0 | 0 |
| $Al_2O_3$ | 3.6 | 7.1 | 3.6 | 7.1 |
| $CeO_2$ | 0.2 | 0.2 | 0.2 | 0.2 |
| Er | 1.22 | 0 | 1.27 | 0 |
| n | 2.05 | 2.01 | 2.02 | 2.01 |
| $T_g$ | 505 | 485 | 490 | 485 |

TABLE 2

|  | Example 3 (core) | Example 3 (cladding) | Example 4 (core) | Example 4 (cladding) |
|---|---|---|---|---|
| $Bi_2O_3$ | 42.7 | 42.7 | 42.7 | 42.7 |
| $SiO_2$ | 31.4 | 31.4 | 31.4 | 31.4 |
| $Ga_2O_3$ | 17.8 | 14.3 | 17.8 | 14.3 |
| $La_2O_3$ | 4.3 | 4.3 | 4.3 | 4.3 |
| $Al_2O_3$ | 3.6 | 7.1 | 3.6 | 7.1 |
| $CeO_2$ | 0.2 | 0.2 | 0.2 | 0.2 |
| Er | 0.65 | 0 | 0.32 | 0 |
| n | 2.05 | 2.04 | 2.05 | 2.04 |
| $T_g$ | 505 | 508 | 505 | 508 |

TABLE 3

|  | Example 5 (core) | Example 5 (cladding) | Example 6 (core) | Example 6 (cladding) |
|---|---|---|---|---|
| $Bi_2O_3$ | 42.8 | 42.8 | 42.8 | 42.8 |
| $SiO_2$ | 34.2 | 34.2 | 35.6 | 35.6 |
| $Ga_2O_3$ | 17.8 | 14.3 | 17.8 | 14.3 |
| $La_2O_3$ | 1.4 | 1.4 | 0 | 0 |
| $Al_2O_3$ | 3.6 | 7.1 | 3.6 | 7.1 |
| $CeO_2$ | 0.2 | 0.2 | 0.2 | 0.2 |
| Er | 0.32 | 0 | 0.65 | 0 |
| n | 2.03 | 2.02 | 2.02 | 2.01 |
| $T_g$ | 490 | 492 | 485 | 485 |

TABLE 4

| Wavelength | 1520 | 1525 | 1530 | 1535 | 1540 | 1545 | 1550 | 1555 | 1560 | 1565 | 1570 |
|---|---|---|---|---|---|---|---|---|---|---|---|
| Fiber 1 | 4.6 | 6.4 | 9.3 | 11.1 | 10.4 | 11.2 | 11.1 | 11.2 | 11.0 | 9.7 | 8.1 |
| Fiber 2 | 0.5 | 1.1 | 3.2 | 4.6 | −5.0 | 5.4 | 4.3 | 4.5 | 5.4 | 5.0 | 3.4 |
| Fiber 3 | — | — | — | 8.2 | 16.1 | 17.6 | 18.1 | 18.6 | 19.0 | 19.0 | 18.9 |

TABLE 4-continued

| Wavelength | 1520 | 1525 | 1530 | 1535 | 1540 | 1545 | 1550 | 1555 | 1560 | 1565 | 1570 |
|---|---|---|---|---|---|---|---|---|---|---|---|
| Fiber 4 | — | — | — | — | 11.2 | 18.8 | 19.6 | 20.1 | 20.3 | 20.5 | 20.5 |
| Fiber 5 | — | — | — | — | 9.4 | 17.0 | 18.3 | 19.0 | 19.3 | 19.8 | 20.2 |
| Fiber 6 | — | — | — | — | — | 5.2 | 13.5 | 15.6 | 16.3 | 16.5 | 16.5 |

TABLE 5

| Wavelength | 1575 | 1580 | 1585 | 1590 | 1595 | 1600 | 1605 | 1610 | 1615 | 1620 |
|---|---|---|---|---|---|---|---|---|---|---|
| Fiber 1 | 7.0 | 6.1 | 6.3 | 6.5 | 6.3 | 5.7 | 5.4 | 5.4 | 5.1 | 5.2 |
| Fiber 2 | 3.2 | 2.7 | 2.8 | 2.2 | 2.4 | 2.2 | 1.7 | 1.9 | 2.1 | 1.6 |
| Fiber 3 | 18.8 | 18.5 | 18.6 | 18.6 | 18.6 | 18.4 | 18.2 | 17.8 | 16.9 | 14.5 |
| Fiber 4 | 20.4 | 20.3 | 20.4 | 20.4 | 20.4 | 20.3 | 20.1 | 19.8 | 19.4 | 18.5 |
| Fiber 5 | 20.1 | 20.0 | 20.0 | 20.0 | 20.0 | 19.9 | 19.7 | 19.5 | 19.1 | 18.2 |
| Fiber 6 | 16.4 | 16.3 | 16.3 | 16.5 | 16.2 | 16.4 | 16.2 | 15.9 | 15.4 | 14.5 |

TABLE 6

| Intensity | 0 | 20 | 40 | 60 | 80 | 100 | 120 | 140 | 160 | 180 | 200 | 230 |
|---|---|---|---|---|---|---|---|---|---|---|---|---|
| Fiber 1 | −9.9 | −4.3 | 2.0 | 4.7 | 6.5 | 7.8 | 8.2 | 8.6 | 9.1 | 9.6 | 9.8 | 9.8 |
| Fiber 2 | −8.8 | −3.6 | 0.2 | 2.0 | 3.8 | 4.3 | 4.8 | 5.0 | 5.2 | 5.4 | 5.4 | 5.4 |

TABLE 7

| Intensity | 0 | 36 | 79 | 100 | 143 | 186 | 229 | 272 | 315 | 358 | 400 |
|---|---|---|---|---|---|---|---|---|---|---|---|
| Fiber 3 | −19.0 | −6.3 | 4.1 | 7.2 | 11.4 | 13.8 | 15.4 | 16.6 | 17.5 | 18.1 | 18.6 |
| Fiber 4 | −24.3 | −6.8 | 7.9 | 11.0 | 14.5 | 16.5 | 17.8 | 18.7 | 19.6 | 20.0 | 20.5 |
| Fiber 5 | −24.6 | 1.7 | 10.5 | 12.7 | 15.3 | 16.7 | 17.8 | 18.7 | 19.3 | 19.8 | 20.3 |
| Fiber 6 | −23.2 | −11.7 | −1.0 | 2.6 | 7.4 | 10.4 | 12.1 | 13.2 | 14.2 | 14.5 | 15.2 |

TABLE 8

| Intensity | 0 | 36 | 79 | 100 | 143 | 186 | 229 | 272 | 315 | 358 | 400 |
|---|---|---|---|---|---|---|---|---|---|---|---|
| Fiber 3 | <0.1 | 0.2 | 2.5 | 5.2 | 13.7 | 24.0 | 34.9 | 45.6 | 55.6 | 64.1 | 71.9 |
| Fiber 4 | <0.1 | 0.2 | 6.1 | 12.6 | 28.3 | 44.3 | 59.6 | 74.3 | 88.1 | 101 | 112 |
| Fiber 5 | <0.1 | 1.5 | 11.2 | 18.6 | 33.9 | 46.8 | 60.3 | 74.1 | 85.1 | 95.5 | 107 |
| Fiber 6 | <0.1 | 0.1 | 0.8 | 1.8 | 5.5 | 10.9 | 16.3 | 20.9 | 26.2 | 28.4 | 32.8 |

TABLE 9

| | Example 7 (core) | Example 7 (cladding) | Example 8 (core) | Example 8 (cladding) | Example 9 (core) | Example 9 (cladding) |
|---|---|---|---|---|---|---|
| $Bi_2O_3$ | 42.7 | 42.7 | 42.7 | 42.7 | 42.7 | 42.7 |
| $SiO_2$ | 32.9 | 32.9 | 34.3 | 34.3 | 35.7 | 35.7 |
| $Ga_2O_3$ | 17.8 | 14.3 | 17.8 | 14.3 | 17.8 | 14.3 |
| $La_2O_3$ | 2.8 | 2.8 | 1.4 | 1.4 | 0 | 0 |
| $Al_2O_3$ | 3.6 | 7.1 | 3.6 | 7.1 | 3.6 | 7.1 |
| $CeO_2$ | 0.2 | 0.2 | 0.2 | 0.2 | 0.2 | 0.2 |
| Er | 0.65 | 0 | 0.65 | 0 | 0.65 | 0 |

According to the present invention, it is possible to obtain an optical amplifying glass and an optical waveguide having an amplifying function, whereby a thermal damage is less likely to take place even if a laser beam having a high intensity is used as an excitation light, and concentration quenching is less likely to take place.

Further, it is possible to obtain an optical fiber having a desired amplifying function even if the length is short and which can be used for EDFA without being wound into a bobbin.

Further, it is also possible to obtain an optical waveguide having a high conversion efficiency even in amplification of a light in a wavelength region including L band. Further, it is also possible to obtain an optical waveguide having a broad 3-dB down bandwidth in the same amplification, and it is further possible to obtain an optical waveguide whereby the gain at 1,620 nm is at least 10 dB.

The entire disclosure of Japanese Patent Application No. 2001-313157 filed on Oct. 10, 2001 including specification, claims and summary is incorporated herein by reference in its entirety.

What is claimed is:

1. An optical amplifying glass comprising 100 parts by mass of a matrix glass and from 0.1 to 10 parts by mass of Er doped to the matrix glass, wherein the matrix glass comprises $Bi_2O_3$, at least one of $B_2O_3$ and $SiO_2$, at least one member selected from the group consisting of $Ga_2O_3$, $WO_3$ and $TeO_2$, and $La_2O_3$ in such a ratio that $Bi_2O_3$ is from 20 to 80 mol %, $B_2O_3+SiO_2$ is from 5 to 75 mol %, $Ga_2O_3+WO_3+TeO_2$ is from 0.1 to 35 mol %, and $La_2O_3$ is from 0.01 to 15 mol %.

2. The optical amplifying glass according to claim 1, wherein the matrix glass consists essentially of, as represented by mol % based on the following oxides:

| | |
|---|---|
| $Bi_2O_3$ | 20 to 80%, |
| $B_2O_3$ | 0 to 60%, |
| $SiO_2$ | 0 to 60%, |
| $Ga_2O_3$ | 0 to 30%, |
| $WO_3$ | 0 to 30%, |
| $TeO_2$ | 0 to 30%, |
| $La_2O_3$ | 0.01 to 15%, |
| $Al_2O_3$ | 0 to 10%, |
| $GeO_2$ | 0 to 30%, |
| $TiO_2$ | 0 to 30%, |
| $SnO_2$ | 0 to 30%, and |
| $CeO_2$ | 0 to 2%. |

3. The optical amplifying glass according to claim 1, wherein the content of $La_2O_3$ in the matrix glass is from 0.5 to 4 mol %.

4. The optical amplifying glass according to claim 1, wherein Er is doped in a proportion of from 1 to 3 parts by mass per 100 parts by mass of the matrix glass.

5. The optical amplifying glass according to claim 1, wherein Er is doped in a proportion of less than 1 part by mass per 100 parts by mass of the matrix glass.

6. An optical waveguide comprising the optical amplifying glass as defined in claim 1, as the core.

7. The optical waveguide according to claim 6, which has a gain of at least 8 dB for a light having a wavelength of from 1,530 nm to 1,560 nm and an intensity of 0.1 mW, when the length of the optical waveguide is 5 cm.

8. The optical waveguide according to claim 6, which has a 3-dB down bandwidth of at least 55 nm for a light having an intensity of 1 mW within a wavelength region of from 1,530 to 1,620 nm and which has a conversion efficiency of at least 10% for a light having a wavelength of 1,600 nm.

9. The optical waveguide according to claim 6, which has a gain of at least 10 dB for a light having a wavelength of 1,620 nm and an intensity of 1 mW, and which has a conversion efficiency of at least 10% for a light having a wavelength of 1600 nm.

* * * * *